United States Patent
Zilka

(10) Patent No.: US 8,781,523 B2
(45) Date of Patent: Jul. 15, 2014

(54) SYSTEM, METHOD, AND COMPUTER PROGRAM PRODUCT FOR USING A CELLULAR PHONE AS AN INTERFACE FOR A VOIP-EQUIPPED COMPUTER

(71) Applicant: Kevin J. Zilka, Los Gatos, CA (US)

(72) Inventor: Kevin J. Zilka, Los Gatos, CA (US)

(73) Assignee: Stragent, LLC, Longview, TX (US)

( * ) Notice: Subject to any disclaimer, the term of this patent is extended or adjusted under 35 U.S.C. 154(b) by 0 days.

(21) Appl. No.: 13/717,661

(22) Filed: Dec. 17, 2012

(65) Prior Publication Data

US 2013/0210482 A1    Aug. 15, 2013

Related U.S. Application Data

(63) Continuation of application No. 11/180,991, filed on Jul. 12, 2005, now Pat. No. 8,364,081.

(60) Provisional application No. 60/587,343, filed on Jul. 12, 2004.

(51) Int. Cl.
| | | |
|---|---|---|
| *H04M 1/00* | (2006.01) |
| *H04W 88/06* | (2009.01) |
| *H04W 84/16* | (2009.01) |
| *H04W 16/20* | (2009.01) |
| *H04M 1/725* | (2006.01) |
| *H04M 1/733* | (2006.01) |
| *H04B 1/40* | (2006.01) |

(52) U.S. Cl.
CPC .............. *H04W 88/06* (2013.01); *H04W 84/16* (2013.01); *H04W 16/20* (2013.01); *H04M 1/725* (2013.01); *H04M 1/733* (2013.01); *H04B 1/406* (2013.01)

USPC ........ 455/552.1; 455/462; 455/555; 370/466; 375/356

(58) Field of Classification Search
CPC ..... H04W 88/06; H04W 84/16; H04W 16/20; H04M 1/725; H04M 1/733; H04B 1/406
USPC .......... 455/456.1–456.6, 552.1–553.1, 426.1, 455/41.2, 436, 569.1, 343.5, 443, 465, 455/127.5; 370/338, 347, 466, 351; 340/870.11, 870.06; 709/230, 222; 701/36

See application file for complete search history.

(56) References Cited

U.S. PATENT DOCUMENTS

| | | | | |
|---|---|---|---|---|
| 5,488,649 | A | * | 1/1996 | Schellinger ................... 455/411 |
| 6,052,592 | A | * | 4/2000 | Schellinger et al. .......... 455/445 |
| 6,381,457 | B1 | * | 4/2002 | Carlsson et al. ............ 455/435.2 |

(Continued)

OTHER PUBLICATIONS

Ask Search, voip wireless application protocol (Dec. 29, 2011).

(Continued)

*Primary Examiner* — Mahendra Patel
(74) *Attorney, Agent, or Firm* — Patrick E. Caldwell, Esq.; The Caldwell Firm, LLC

(57) ABSTRACT

A system, method and computer program product are provided. Included is a cellular phone capable of communicating via a long-range cellular network protocol and a short-range protocol. Further included is a system capable of communicating via a long-range hard-line network protocol and the short-range protocol. Thus, when the cellular phone is in the proximity of the system, the cellular phone communicates with the system utilizing the short-range protocol, so that the cellular phone is used to communicate via the long-range hard-line communication network protocol.

37 Claims, 3 Drawing Sheets

(56) References Cited

U.S. PATENT DOCUMENTS

| | | | |
|---|---|---|---|
| 6,507,845 B1 | 1/2003 | Cohen et al. | |
| 6,539,237 B1 * | 3/2003 | Sayers et al. | 455/555 |
| 6,680,923 B1 | 1/2004 | Leon | |
| 6,931,119 B2 | 8/2005 | Michelson et al. | |
| 7,103,344 B2 | 9/2006 | Menard | |
| 7,133,669 B2 | 11/2006 | Nair et al. | |
| 7,139,797 B1 | 11/2006 | Yoakum et al. | |
| 7,142,646 B2 | 11/2006 | Zafar et al. | |
| 7,151,764 B1 | 12/2006 | Heinonen et al. | |
| 7,171,625 B1 | 1/2007 | Sacchi | |
| 7,221,255 B2 | 5/2007 | Johnson et al. | |
| 7,248,570 B2 | 7/2007 | Bahl et al. | |
| 7,340,214 B1 | 3/2008 | Hamberg | |
| 7,415,439 B2 | 8/2008 | Kontio et al. | |
| 7,421,411 B2 | 9/2008 | Kontio et al. | |
| 7,555,287 B1 | 6/2009 | Heinonen et al. | |
| 7,610,047 B2 | 10/2009 | Hicks, III et al. | |
| 7,734,293 B2 | 6/2010 | Zilliacus et al. | |
| 7,830,868 B2 | 11/2010 | Buckley | |
| 8,023,953 B2 | 9/2011 | Zilliacus et al. | |
| 8,130,703 B2 | 3/2012 | Markovic et al. | |
| 8,165,585 B2 | 4/2012 | Gallagher et al. | |
| 8,351,591 B2 | 1/2013 | Kirchhoff et al. | |
| 8,457,113 B2 | 6/2013 | Wood et al. | |
| 8,483,374 B1 | 7/2013 | Tonogai et al. | |
| 8,537,812 B2 | 9/2013 | Hester | |
| 2001/0031645 A1 * | 10/2001 | Jarrett | 455/552 |
| 2002/0023131 A1 | 2/2002 | Wu et al. | |
| 2002/0023134 A1 | 2/2002 | Roskowski et al. | |
| 2002/0078151 A1 | 6/2002 | Wickam et al. | |
| 2002/0102974 A1 * | 8/2002 | Raith | 455/434 |
| 2002/0147016 A1 * | 10/2002 | Arazi et al. | 455/443 |
| 2003/0028410 A1 | 2/2003 | House et al. | |
| 2003/0061294 A1 | 3/2003 | Stennicke | |
| 2003/0084184 A1 | 5/2003 | Eggleston et al. | |
| 2003/0119568 A1 | 6/2003 | Menard | |
| 2003/0147381 A1 | 8/2003 | Nelson et al. | |
| 2004/0010431 A1 | 1/2004 | Thomas et al. | |
| 2004/0116120 A1 * | 6/2004 | Gallagher et al. | 455/436 |
| 2004/0141599 A1 | 7/2004 | Tang et al. | |
| 2004/0146021 A1 * | 7/2004 | Fors et al. | 370/331 |
| 2004/0172456 A1 | 9/2004 | Green et al. | |
| 2004/0249768 A1 | 12/2004 | Kontio et al. | |
| 2005/0004875 A1 | 1/2005 | Kontio et al. | |
| 2005/0021624 A1 | 1/2005 | Herf et al. | |
| 2005/0097356 A1 | 5/2005 | Zilliacus et al. | |
| 2005/0195068 A1 | 9/2005 | Johnson et al. | |
| 2005/0271020 A1 * | 12/2005 | Thermond | 370/338 |
| 2007/0112676 A1 | 5/2007 | Kontio et al. | |
| 2007/0153986 A1 | 7/2007 | Bloebaum et al. | |
| 2010/0023603 A1 | 1/2010 | Archer et al. | |
| 2010/0254376 A1 | 10/2010 | Wood et al. | |
| 2010/0281398 A1 | 11/2010 | Melideo | |
| 2012/0236762 A1 | 9/2012 | Wood et al. | |
| 2012/0330755 A1 | 12/2012 | Ahn et al. | |
| 2013/0322431 A1 | 12/2013 | Wood et al. | |
| 2013/0324096 A1 | 12/2013 | Fuoss et al. | |

OTHER PUBLICATIONS webopedia computer dictionary, VoIP (Dec. 29, 2011).
webopedia computer dictionary, VoIP Call (Dec. 29, 2011).
webopedia computer dictionary, VoIP Meets WiFi (Dec. 29, 2011).
Kanter et al., Smart Delivery of Multimedia Content for Wireless Applications, 2000, the 2nd International Workshop on Mobile and Wireless Communications Networks.
Perini, Wireless Applications using internet Protocol and Voice Over IP, 2000, IEEE.
Office Action Summary from U.S. Appl. No. 11/828,027 dated Dec. 7, 2012.
Office Action Summary from U.S. Appl. No. 11/207,428 dated Oct. 14, 2008.
Office Action Summary from U.S. Appl. No. 11/207,428 dated Jan. 24, 2008.
Office Action Summary from U.S. Appl. No. 11/207,428 dated Jun. 26, 2008.
Office Action Summary from U.S. Appl. No. 11/207,428 dated Oct. 31, 2007.
Office Action Summary from U.S. Appl. No. 11/828,022 dated May 26, 2010.
Office Action Summary from U.S. Appl. No. 11/828,022 dated Dec. 14, 2009.
Office Action Summary from U.S. Appl. No. 11/828,027 dated Jan. 30, 2009.
Office Action Summary from U.S. Appl. No. 11/828,027 dated Mar. 23, 2009.
Office Action Summary from U.S. Appl. No. 11/828,027 dated May 26, 2010.
Office Action Summary from U.S. Appl. No. 11/828,027 dated Jun. 26, 2008.
Office Action Summary from U.S. Appl. No. 11/828,027 dated Jun. 28, 2011.
Office Action Summary from U.S. Appl. No. 11/828,027 dated Oct. 28, 2009.
Office Action Summary from U.S. Appl. No. 11/828,027 dated Jan. 5, 2012.

* cited by examiner

SYSTEM, METHOD, AND COMPUTER PROGRAM PRODUCT FOR USING A CELLULAR PHONE AS AN INTERFACE FOR A VOIP-EQUIPPED COMPUTER

RELATED APPLICATION(S)

The present application is a continuation of an application filed Jul. 12, 2005 under Ser. No. 11/180,991 claims priority from a provisional application filed Jul. 12, 2004 under application Ser. No. 60/587,343, which is incorporated herein by reference.

BACKGROUND AND FIELD OF THE INVENTION

The present invention relates to VoIP communications, and more particularly to integrating cell phone technology with computer systems equipped with VoIP functionality.

SUMMARY

A system, method and computer program product are provided. Included is a cellular phone capable of communicating via a long-range cellular network protocol and a short-range protocol. Further included is a system capable of communicating via a long-range hard-line network protocol and the short-range protocol. Thus, when the cellular phone is in the proximity of the system, the cellular phone communicates with the system utilizing the short-range protocol, so that the cellular phone is used to communicate via the long-range hard-line communication network protocol.

DETAILED DESCRIPTION

Figure 1:
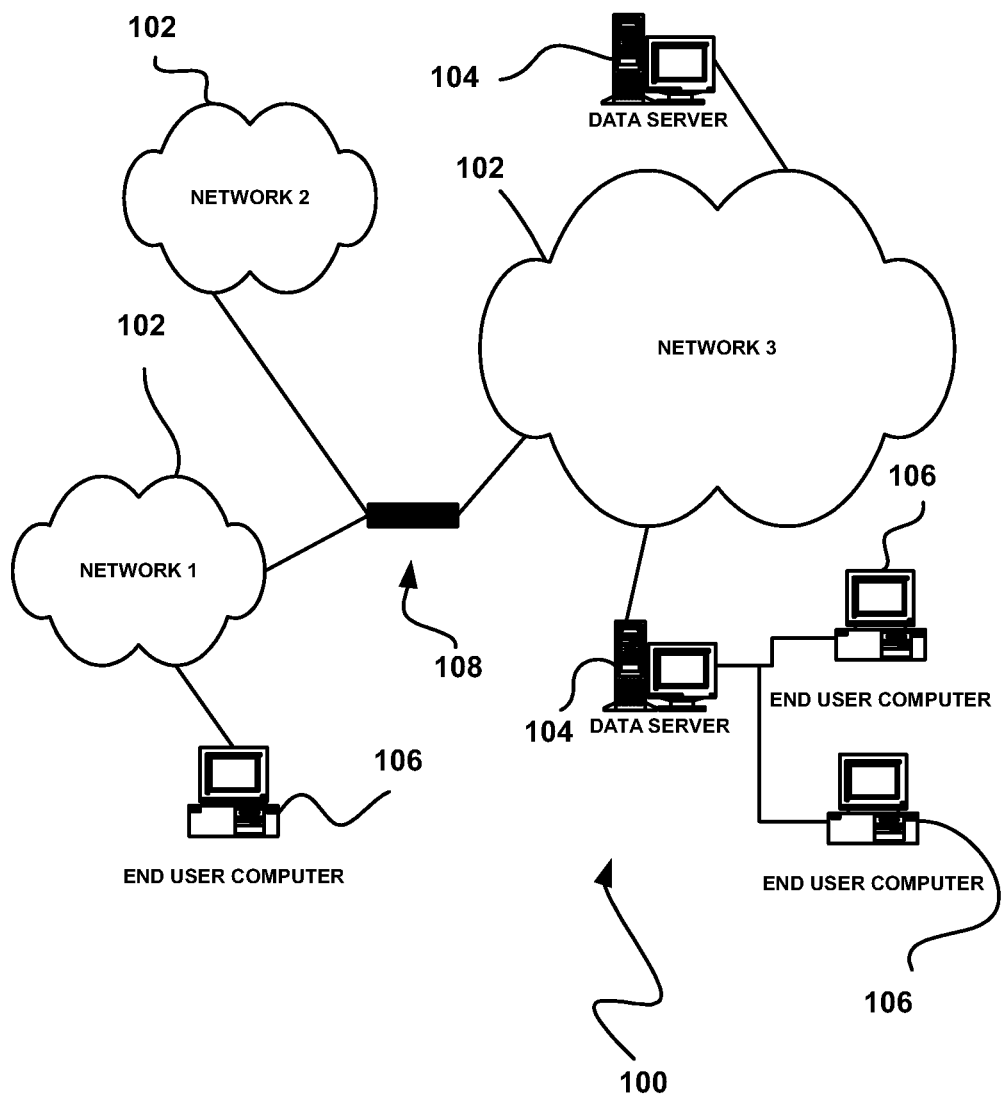
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

Figure 2:
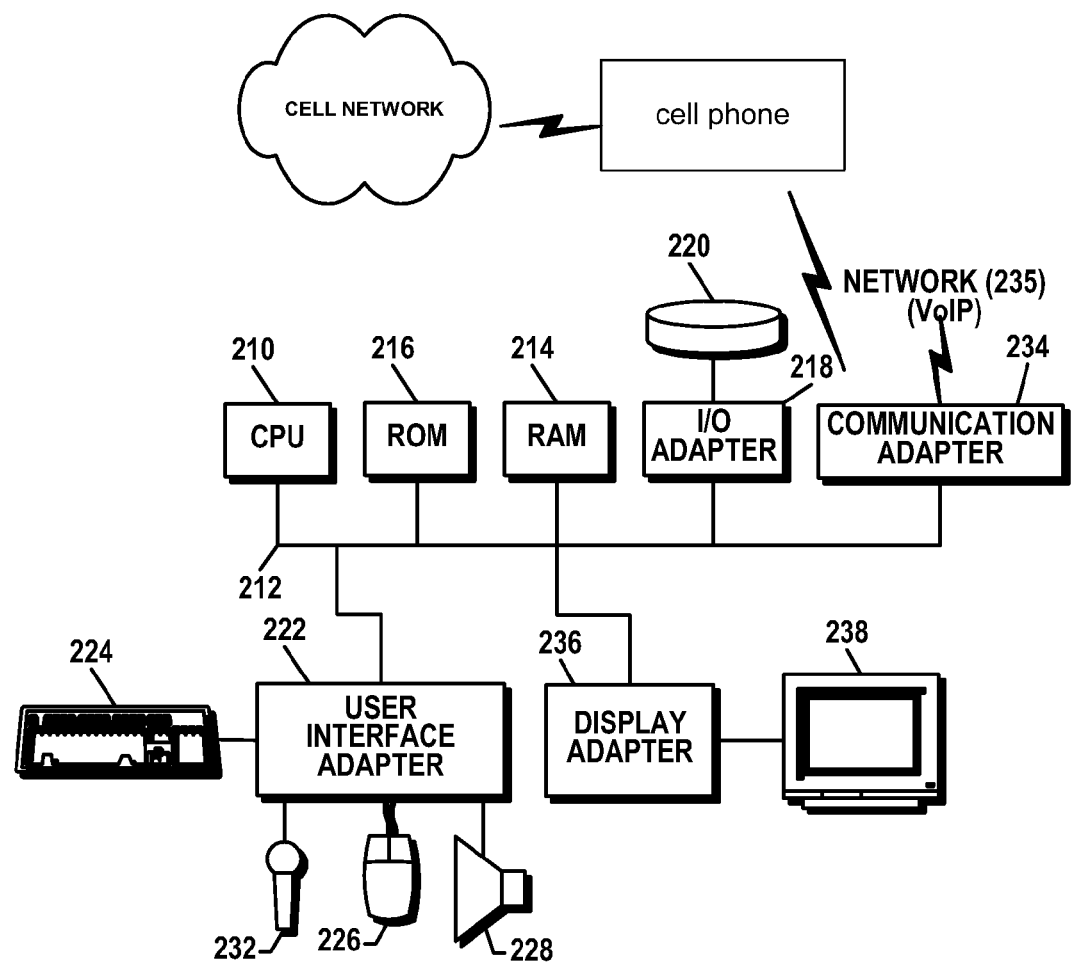
FIG. 2 shows a representative hardware environment that may be associated with the data server computers and/or end user computers of FIG. 1, in accordance with one embodiment.

FIG. 2 shows a representative hardware environment, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network such as the Internet) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Further included is a cellular phone (not numbered) that communicates with the computer as well as a cellular network.

Our course, the various embodiments set forth herein may be implemented utilizing hardware, software, or any desired combination thereof. For that matter, any type of logic may be utilized which is capable of implementing the various functionality set forth herein.

Figure 3:
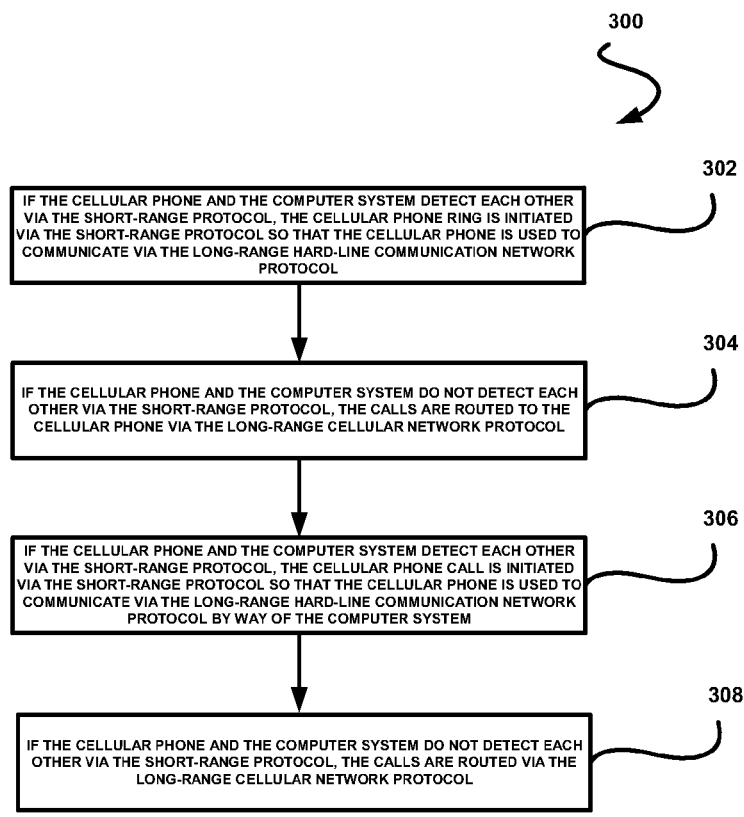
FIG. 3 illustrates a method for converging cell phone use with computer system VoIP use, in accordance with one embodiment.

FIG. 3 illustrates a method 300 for converging cell phone use with computer system VoIP use, in accordance with one embodiment. As an option, the present method 300 may be implemented in the context of the architecture and environment of FIGS. 1 and/or 2. Of course, however, the method 300 may be carried out in any desired environment.

Included is a cellular phone capable of communicating via a long-range cellular network protocol and a short-range protocol. Further included is a computer system capable of communicating via a long-range hard-line network protocol and the short-range protocol. Note, for example, the illustrative architecture of FIGS. 1 and 2.

In one embodiment, the long-range cellular network protocol includes a Global System for Mobile (GSM) protocol, the short-range protocol includes Bluetooth or 802.11 protocol, and the long-range hard-line network protocol includes voice over Internet Protocol (VoIP).

Thus, when the cellular phone is in the proximity of the computer system, the cellular phone communicates with the computer system utilizing the short-range protocol, so that the cellular phone is used to communicate via the long-range hard-line communication network protocol.

As an option, the cellular phone and the computer system may automatically detect each other, and communicate via the short-range protocol upon said detection.

In use, a single phone number may be used in association with the computer system, such that calls are received via the computer system. If the cellular phone and the computer system detect each other via the short-range protocol, the cellular phone ring is initiated via the short-range protocol so that the cellular phone is used to communicate via the long-range hard-line communication network protocol. Note operation 302. If, however, the cellular phone and the computer system do not detect each other via the short-range protocol, the calls are routed to the cellular phone via the long-range cellular network protocol. See operation 304.

Still yet, if the cellular phone and the computer system detect each other via the short-range protocol, the cellular phone call is initiated via the short-range protocol so that the cellular phone is used to communicate via the long-range hard-line communication network protocol by way of the computer system. See operation 306. Finally, if the cellular phone and the computer system do not detect each other via the short-range protocol, the calls are routed via the long-range cellular network protocol. Note operation 308.

As a further option, the computer system may include an interface that is displayed upon said detection. Such interface may indicate details regarding the communication long-range hard-line network protocol.

As yet another option, a cellular phone component such as a cellular phone headset (which is capable of communicating with the cellular phone via the short-range protocol) may further be capable of communicating directly with the computer system via the short-range protocol, to carry out the functionality set forth herein. Of course the various control logic necessary to carry out such functionality may be positioned either in the cellular phone and/or component thereof.

Thus, a speaker or a microphone of the cellular phone may used for communicating using the long-range hard-line network protocol via the computer system, thus obviating the need for a separate speaker or microphone on the computer system. Similarly, a dial pad of the cellular phone may be used for initiating the communications using the long-range hard-line network protocol via the computer system.

To this end, the long-range hard-line network protocol may be used in lieu of long-range cellular network protocol for cost savings, security, and increasing the integrity of the communications.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. An apparatus, comprising:
   a cellular phone capable of communicating via a long-range cellular network protocol and a short-range protocol such that, when the cellular phone is in communication with a system capable of communicating via a long-range Internet communication protocol, the cellular phone is capable of communicating using the system via the short-range protocol, so that the cellular phone is capable of being used to communicate via the long-range Internet communication protocol;
   wherein the cellular phone is configured to automatically detect the system, and communicate via the short-range protocol upon the detection;
   wherein the cellular phone is configured such that a single phone number is capable of being used for a call whether the call is carried out via the short-range protocol so that the cellular phone is used to communicate via the long-range Internet communication protocol, or the call is carried out via the long-range cellular network protocol so that the cellular phone is used to communicate via the long-range cellular network protocol, such that:
   if the cellular phone detects the system and is capable of communicating using the system via the short-range protocol, the call is carried out via the short-range protocol so that the cellular phone is used to communicate via the long-range Internet communication protocol, and details regarding the communication via the long-range Internet communication protocol are capable of being indicated utilizing an interface by displaying long-range Internet communication protocol information; and
   if the cellular phone does not detect the system via the short-range protocol, the call is carried out via the long-range cellular network protocol so that the cellular phone is used to communicate via the long-range cellular network protocol.

2. The apparatus as recited in claim 1, wherein the cellular phone is configured such that the long-range cellular network protocol includes a Global System for Mobile (GSM) protocol.

3. The apparatus as recited in claim 1, wherein the cellular phone is configured such that the short-range protocol includes Bluetooth protocol.

4. The apparatus as recited in claim 1, wherein the cellular phone is configured such that the long-range Internet communication protocol includes voice over Internet Protocol (VoIP).

5. The apparatus as recited in claim 1, wherein the cellular phone is configured such that the short-range protocol includes 802.11 protocol.

6. The apparatus as recited in claim 1, wherein the cellular phone is configured such that a user interface of the cellular phone is capable of being used for initiating the call such that it is carried out via the short-range protocol so that the cellular phone is used to communicate via the long-range Internet communication protocol.

7. The apparatus as recited in claim 6, wherein the cellular phone is configured such that the user interface of the cellular phone allows access to a dial pad.

8. The apparatus as recited in claim 1, wherein the cellular phone is configured such that the long-range Internet communication protocol is used in lieu of the long-range cellular network protocol for cost savings.

9. The apparatus as recited in claim 1, wherein the cellular phone is configured such that the long-range Internet communication protocol is used in lieu of the long-range cellular network protocol for security purposes.

10. The apparatus as recited in claim 1, wherein the cellular phone is configured such that the long-range Internet communication protocol is used in lieu of the long-range cellular network protocol for communication integrity.

11. The apparatus as recited in claim 1, wherein the cellular phone is configured such that the system includes the interface.

12. The apparatus as recited in claim 1, wherein the cellular phone is configured to include the interface.

13. The apparatus as recited in claim 1, wherein the cellular phone is configured such that the single phone number is capable of being used so that, if the cellular phone detects the system and is capable of communicating using the system via the short-range protocol, the call is initiated via the short-range protocol.

14. The apparatus as recited in claim 1, wherein the cellular phone is configured such that the single phone number is capable of being used so that, if the cellular phone detects the system and is capable of communicating using the system via the short-range protocol, the call is received via the short-range protocol.

15. The apparatus as recited in claim 1, wherein the cellular phone is configured such that the single phone number is capable of being used so that, if the cellular phone does not detect the system via the short-range protocol, the call is routed via the long-range cellular network protocol so that the cellular phone is used to communicate via the long-range cellular network protocol.

16. The apparatus as recited in claim 1, wherein the cellular phone is configured such that the call is a received call.

17. The apparatus as recited in claim 1, wherein the cellular phone is configured such that the call is a sent call.

18. The apparatus as recited in claim 1, wherein the cellular phone is configured such that the system is coupled to a gateway.

19. The apparatus as recited in claim 1, wherein the cellular phone is configured such that the system includes a gateway.

20. The apparatus as recited in claim 1, wherein the cellular phone is configured such that the system is coupled to a router.

21. The apparatus as recited in claim 1, wherein the cellular phone is configured such that the system includes a router.

22. The apparatus as recited in claim 1, wherein the cellular phone is configured such that the system includes one or more servers that is accessible via a communication interface.

23. The apparatus as recited in claim 1, wherein the cellular phone is configured such that the system includes one or more servers that is accessible via a router.

24. The apparatus as recited in claim 1, wherein the cellular phone is configured such that the system includes a computer.

25. The apparatus as recited in claim 1, wherein the cellular phone is configured such that the system includes a computer system.

26. The apparatus as recited in claim 1, wherein the cellular phone is configured such that an indicator is presented upon the detection.

27. The apparatus as recited in claim 1, wherein the cellular phone is configured such that the long-range Internet communication protocol includes a long-range hard-line network protocol.

28. The apparatus as recited in claim 1, wherein the cellular phone is configured such that the system includes a communication interface for communicating via the short-range protocol and a processor in the same station.

29. A system, comprising: the apparatus as recited in claim 1, and further comprising the system.

30. The apparatus as recited in claim 1, wherein the cellular phone is configured such that, if the cellular phone detects the system and is capable of communicating using the system via the short-range protocol, the call is carried out via the short-range protocol so that the cellular phone is used to communicate over the Internet via the long-range Internet communication protocol.

31. The apparatus as recited in claim 1, wherein the cellular phone is configured such that the single phone number is capable of being used so that, if the cellular phone detects the system and is capable of communicating using the system via the short-range protocol, the call is received and a ring is initiated via the short-range protocol.

32. The apparatus as recited in claim 1, wherein the cellular phone is configured such that the cellular phone is capable of being used for manually initiating the call via the short-range protocol so that the cellular phone is used to communicate via the long-range Internet communication protocol.

33. The apparatus as recited in claim 1, wherein the cellular phone is configured such that a user interface of the cellular phone is capable of being used for initiating the call such that the cellular phone is used to communicate via the long-range Internet communication protocol.

34. A computer program product embodied on a non-transitory computer readable medium, comprising:
code for working in association with a cellular phone capable of communicating via a long-range cellular network protocol and a short-range protocol such that, when the cellular phone is in communication with a system capable of communicating via an Internet communication protocol, the cellular phone is capable of communicating using the system via the short-range protocol, so that the cellular phone is capable of being used to communicate via the Internet communication protocol;
wherein the computer program product is configured such that the cellular phone automatically detects the system, and communicates via the short-range protocol upon the detection;
wherein the computer program product is configured such that a single phone number is capable of being used for a call whether the call is carried out via the short-range protocol so that the cellular phone is used to communicate via the Internet communication protocol, or the call is carried out via the long-range cellular network protocol so that the cellular phone is used to communicate via the long-range cellular network protocol, where:
if the cellular phone detects the system and is capable of communicating using the system via the short-range protocol, the call is carried out via the short-range protocol so that the cellular phone is used to communicate via the Internet communication protocol, such that details regarding the communication via the Internet communication protocol are available via an interface by display of long-range Internet communication protocol communication information; and
if the cellular phone does not detect the system such that the cellular phone is incapable of communicating using the system via the short-range protocol, the call is carried out via the long-range cellular network protocol so that the cellular phone is used to communicate via the long-range cellular network protocol.

35. The computer program product as recited in claim 34, wherein the computer program product is configured such that the cellular phone is capable of being used for manually initiating the call via the short-range protocol so that the cellular phone is used to communicate via the long-range Internet communication protocol.

36. A system, comprising:
at least one system component capable of communicating with a cellular phone that is capable of communicating via a long-range cellular network protocol and a short-range protocol such that, when the cellular phone is in communication with the at least one system component capable of communicating via an Internet communication protocol and the short-range protocol, the at least one system component operates such that the cellular phone is capable of communicating using the at least one system component, so that the cellular phone is capable of being used to communicate via the Internet communication protocol;
wherein the at least one system component is configured to automatically detect the cellular phone;
wherein the at least one system component is configured such that a single phone number is capable of being used for a call whether the call is carried out via the short-range protocol so that the cellular phone is used to communicate via the Internet communication protocol, or the call is carried out via the long-range cellular network protocol so that the cellular phone is used to communicate via the long-range cellular network protocol, where:
if the cellular phone and the at least one system component are in communication utilizing the short-range protocol, the at least one system component operates such that the call is carried out via the short-range protocol so that the cellular phone is used to communicate via the Internet communication protocol, where the at least one system component is configured such that details regarding the communication via the Internet communication protocol are available via an interface by display of long-range Internet communication protocol communication information; and if the cellular phone and the least one system component do not detect each other, the at least one system component operates such that the call is carried out via the long-range cellular network protocol so that the cellular phone is used to communicate via the long-range cellular network protocol.

37. The system as recited in claim 36, wherein the system is configured such that the cellular phone is allowed to be used for manually initiating the call via the short-range protocol so that the cellular phone is used to communicate via the long-range Internet communication protocol.

\* \* \* \* \*